(12) United States Patent
Matusik et al.

(10) Patent No.: US 10,456,984 B2
(45) Date of Patent: Oct. 29, 2019

(54) ADAPTIVE MATERIAL DEPOSITION FOR ADDITIVE MANUFACTURING

(71) Applicant: Massachusetts Institute of Technology, Cambridge, MA (US)

(72) Inventors: Wojciech Matusik, Lexington, MA (US); Allen S. Park, Cambridge, MA (US); Javier E. Ramos, San Juan, PR (US); Kiril Vidimce, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/843,543

(22) Filed: Dec. 15, 2017

(65) Prior Publication Data
US 2018/0169953 A1    Jun. 21, 2018

Related U.S. Application Data

(60) Provisional application No. 62/435,644, filed on Dec. 16, 2016.

(51) Int. Cl.
*B33Y 50/02* (2015.01)
*B29C 64/393* (2017.01)
(Continued)

(52) U.S. Cl.
CPC .......... *B29C 64/393* (2017.08); *B29C 64/112* (2017.08); *B29C 64/124* (2017.08);
(Continued)

(58) Field of Classification Search
None
See application file for complete search history.

(56) References Cited

U.S. PATENT DOCUMENTS 6,347,257 B1    2/2002 Bedal et al.
6,492,651 B2 *  12/2002 Kerekes .............. B29C 67/0059
                                                        250/548
(Continued)

FOREIGN PATENT DOCUMENTS

WO    20140015994    1/2014
WO    WO2016019434 A1    2/2016

OTHER PUBLICATIONS

Alexa, Marc, and Wojciech Matusik. "Reliefs as images." ACM Trans. Graph. 29, No. 4 (2010): 60-1.
(Continued)

*Primary Examiner* — Thomas C Lee
*Assistant Examiner* — Gary Collins
(74) *Attorney, Agent, or Firm* — Occhiuti & Rohlicek LLP

(57) ABSTRACT

A closed-loop adaptive material deposition apparatus and method uses a scanning system to monitor an additively manufactured object as it is being fabricated and adapting the geometric shape and material composition of the subsequent layers based on the scan data. The scanning system repeatedly captures geometric and/or material information of a partially manufactured object with optional auxiliary objects inserted during the manufacturing process. Based on this information, the actual surface geometry and/or actual material composition is computed. Surface geometry may be offset and used as a slicing surface for the next portion of the digital model. The shape of the slicing surface may then be recomputed each time the system scans the partially fabricated object.

18 Claims, 7 Drawing Sheets

(51) Int. Cl.
*B29C 64/112* (2017.01)
*B29C 64/124* (2017.01)
*G05B 19/4099* (2006.01)
*B33Y 30/00* (2015.01)
*B33Y 10/00* (2015.01)

(52) U.S. Cl.
CPC .......... *B33Y 50/02* (2014.12); *G05B 19/4099* (2013.01); *B33Y 10/00* (2014.12); *B33Y 30/00* (2014.12); *G05B 2219/35134* (2013.01); *G05B 2219/49007* (2013.01); *Y02P 80/40* (2015.11)

(56) References Cited

U.S. PATENT DOCUMENTS

| | | | |
|---|---|---|---|
| 6,508,971 B2 | 1/2003 | Leyden et al. | |
| 7,077,334 B2 | 7/2006 | Sachs et al. | |
| 7,596,249 B2 | 9/2009 | Bacus et al. | |
| 7,747,341 B2 | 6/2010 | Dubois et al. | |
| 8,147,910 B2* | 4/2012 | Kritchman | B33Y 10/00 264/308 |
| 8,313,163 B2 | 11/2012 | Eun et al. | |
| 8,451,510 B2 | 5/2013 | Hwang et al. | |
| 8,666,142 B2 | 3/2014 | Shkolnik et al. | |
| 9,202,310 B2 | 12/2015 | Bickel et al. | |
| 9,205,690 B2 | 12/2015 | Leavitt et al. | |
| 9,327,537 B2 | 5/2016 | Conrow et al. | |
| 2002/0093115 A1* | 7/2002 | Jang | B29C 64/165 264/113 |
| 2006/0111807 A1 | 5/2006 | Gothait et al. | |
| 2006/0156978 A1* | 7/2006 | Lipson | A61L 27/36 118/708 |
| 2008/0252682 A1 | 10/2008 | Hernandez et al. | |
| 2013/0089642 A1* | 4/2013 | Lipson | A23P 20/20 426/115 |
| 2015/0134096 A1 | 5/2015 | Travers et al. | |
| 2015/0261196 A1 | 9/2015 | Wilson et al. | |
| 2015/0266242 A1 | 9/2015 | Comb | B29C 64/393 264/40.1 |
| 2016/0023403 A1 | 1/2016 | Ramos et al. | |
| 2016/0263822 A1* | 9/2016 | Boyd, IV | B33Y 10/00 |
| 2017/0050374 A1* | 2/2017 | Minardi | G05B 15/02 |
| 2017/0120337 A1* | 5/2017 | Kanko | B22F 3/1055 |
| 2017/0318186 A1* | 11/2017 | Morovic | H04N 1/405 |
| 2017/0341183 A1* | 11/2017 | Buller | B23K 26/342 |

OTHER PUBLICATIONS

Introduction to Digital Images, Internet Archive Wayback Machine, https://web.archive.org/web/20130628011645/www.introcomputing.org/image-1-introduction.html. Published Jun. 28, 2013.

Nemeth, A. et al., "Optical coherence tomography—Applications in non-destructive testing and evaluation," Optical Coherence Tomography, Ch. 9, pp. 163-185, 2013.

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

International Search Report and Written Opinion, dated Oct. 9, 2018 (12 pages).

* cited by examiner

ADAPTIVE MATERIAL DEPOSITION FOR ADDITIVE MANUFACTURING

CROSS-REFERENCE TO RELATED APPLICATIONS

This application claims the benefit of U.S. Provisional Application No. 62/435,644 filed Dec. 16, 2016, which is incorporated herein by reference.

STATEMENT AS TO FEDERALLY SPONSORED RESEARCH

This invention was made with government support under Grant No. IIS-1409310 awarded by the National Science Foundation and Grant No. N66001-15-C-4030 awarded by the Space and Naval Warfare Systems Center. The government has certain rights in the invention.

BACKGROUND

This invention relates to adaptive material deposition for additive manufacturing, and more particularly, to scanning feedback for planning of material deposition to match an object model.

In one approach to additive manufacturing, a digital model is preprocessed to specify a series of parallel planar layers. Specifications of the layers are sent to a fabrication machine that deposits the layers one by one from the bottom to the top to form the object. In some machines, the fabricated layers may be mechanically planarized using a roller (e.g., for photopolymer, phase-change fabrication), a scraper (e.g., for powder-based fabrication), or a mill (e.g., for wax-based fabrication).

In another additive manufacturing process, a closed feedback loop approach uses a 3D scanner or a profilometer to scan the part as it is being manufactured. In an example disclosed in the Applicant's prior patent application publication US2016/0023403, a pre-process slices a digital object model into planar slices, and layers are deposited according to the pre-planned slices. The scanning may occasionally detect an incorrect layer thickness or surface height, and correction layers inserted to planarize the current topmost surface so that further originally planned slices can be used to deposit further layers on the object to yield a fabricated object that accurately matches the digital object model.

SUMMARY

In a general aspect, one or more approaches described herein use a closed-feedback loop that avoids the need to planarize the top surface of the object being fabricated. Rather than relying on pre-planned slices of the object model that are determined before fabrication begins, these approaches plan the slices during the fabrication process to adapt to the actually fabricated object. For example, non-planar layers of uniform thickness may be planned and deposited. Advantages of adapting the slices rather than depositing corrective layers can include faster printing by avoiding delays associated with printing corrective layers, and more accurate matching of the fabricated object to the object model.

In one aspect, in general, a method for additive fabrication of an object represented by three-dimensional model data makes use of first scan data obtained from a scanner after fabricating a first part of the object, where fabricating the first part forms a first surface of the object. This first scan data is used to compute first surface data characterizing the first surface of the object. Second fabrication data that characterizes a second set of layers for additive fabrication on the first surface of the object are then determined according to the first surface data and the three-dimensional model data for the object. At least one layer of the second set of layers represents a non-planar surface (i.e., as deposited on the first part of the object) and/or a non-uniform material composition determined from the first surface data. The second fabrication data is provided to control a printer for fabricating the second set of layers.

Aspect can have one or more of the following features.

The first surface of the object has a varying level. This may be advantageous in that further layers may be deposited without having to form a planar surface.

The layers of the second set of layers are determined to be offset from the first surface, and a have spatial extent in dimensions along the first surface determined from the model data for the object. Each layer of the second set of layers may be determined to have uniform thickness. Each layer may be each uniformly offset from the first surface. An advantage of such a second set of layers is that they may be deposited using uniform application of material, without requiring that the planned layer forms a planar "slice" through the object model.

The first surface data includes a first depth map for the first surface.

Determining the second fabrication data characterizing the second set of layers comprises, for each layer of the second set of layers determining an offset depth map relative to the first depth map, determining a cross-section corresponding to an intersection of the offset depth map and the object determined from the three-dimensional model data, and determining a spatial extent of the cross section.

The model data characterizes a material composition throughout the object, and the first scan data represents a varying material composition associated with the first surface of the object, for example, within a volume of the object adjacent to the first surface.

The second set of layers are determined to have varying material composition determined from the object data and from the varying material composition associated with the first surface, for example, to match the material composition characterized by the model data. An advantage of such determination may be to achieve a desired material composition of the object by making local corrections during fabrication.

The method further includes fabricating the first part of the object, including forming the first surface. The method can also include fabricating a second part of the object on the first surface of the object, including fabricating each layer of the second set of layers according to the determined second fabrication data.

Fabricating the second part of the object forms a next surface of the object, and the method further comprises, repeating (e.g., iterating) one or more times: computing, using scan data obtained from the scanner after fabricating a second part of the object forming a next surface of the object, next surface data characterizing the next surface of the object; determining next fabrication data characterizing a next set of layers for additive fabrication on the next surface of the object according to the next surface data and three-dimensional model data for the object; and fabricating a next part of the object on the next surface of the object, including fabricating each layer of the next set of layers according to the determined next fabrication data, fabricating the next part including forming the next surface of the object.

Scan data obtained from the scanner after fabricating multiple parts of the object may be combined to synthesize a three-dimensional image of the fabricated object.

The first part of the object may be formed by combining of an auxiliary object (e.g., a printed circuit element, structural material, etc.) with a part formed by additive fabrication, such that the auxiliary object forms at least part of the first surface of the object.

In another aspect, in general, a non-transitory machine-readable medium comprises instructions stored thereon for causing a computer controlled three-dimensional printing system to perform all the steps of any method set forth above.

In another aspect, in general, a computer controlled three-dimensional printing system is configured to perform all the steps of any method set forth above In general, the approaches described herein may provide many advantages compared to the traditional additive manufacturing methods. First, the approaches do not require a mechanical flattening mechanism such as a scraper or a roller. This eliminates the material waste introduced by these mechanisms and reduces the complexity of the whole system. Furthermore, since there is no mechanical flattening mechanism which makes a contact with the manufactured object, the printing process can support a more diverse set of materials (e.g., multi-component materials, materials with substantial shrinkage/expansion or even warping), eliminates the reduction of resolution or color bleeding due to smearing, and avoids possible mechanical object displacement. The adaptive process can further compensate for dimensional inaccuracies when working with high-shrinkage or expansion materials or slower activation/curing materials. In the case of multi-material additive manufacturing, the method can improve interfaces between materials that are not fully compatible.

Other features and advantages of the invention are apparent from the following description, and from the claims.

DESCRIPTION

Figure 1:
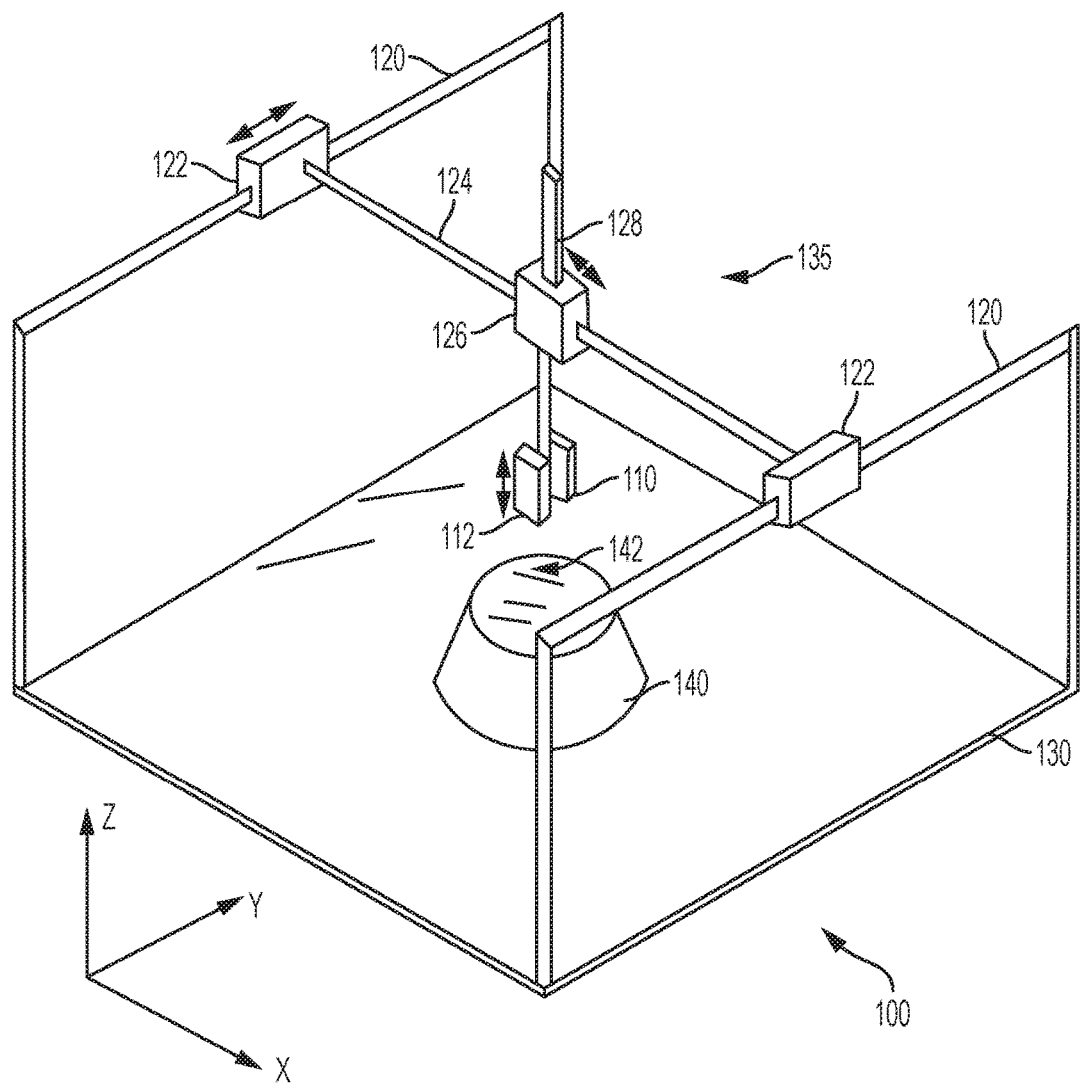
FIG. 1 is an isometric view of a printer/scanner.
Figure 2:
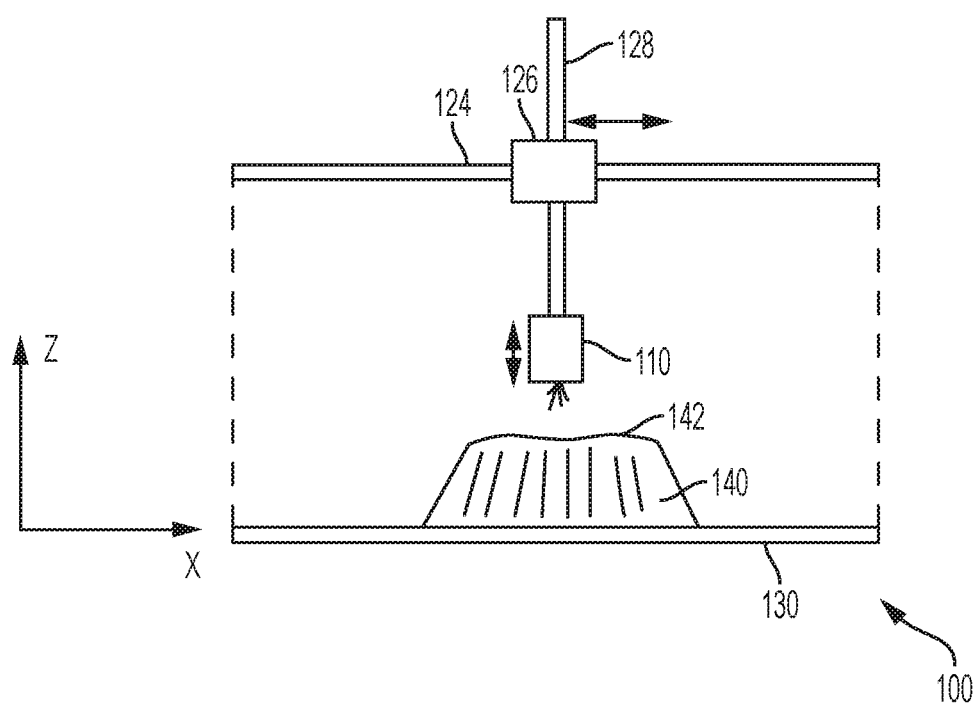
FIG. 2 is a cross-sectional view of the printer/scanner shown in FIG. 1.

Referring to an isometric view of FIG. 1 and a corresponding cross-sectional view of FIG. 2, a schematically represented three-dimensional printer/scanner 100 is used to fabricate an object 140 by "printing" successive thin layers of the object using a printhead 110. Each layer of the object is formed by moving the printhead over the surface 142 of the object, for example, in a raster fashion where a "stripe" of a layer is formed by moving the printhead along the "x" direction while depositing material, and then the printhead is incrementally moved in the "y" direction before forming the next stripe of the layer. Through successive passes, multiple stripes are deposited to form a thin layer extending over a range of x-y coordinates, thereby growing the object in the (positive, "vertical") z direction. In the printer/scanner 100 shown in FIGS. 1-2, a positioning subsystem 135 permits positioning the print head at any (x,y) location over a build platform 130 on which the object is fabricated. Furthermore, for accurate printing, the printhead is preferably positioned close to the surface of the partially fabricated object, requiring control of the position of the printhead relative to the object in the "z" direction. The positioning subsystem 135 includes an arrangement of rails 120, 124, 128 and controlled carriages 122, 126. Two carriages 122 are configured to move under the control of a printing controller transversally in the y direction along corresponding rails 120 extending in the y direction in a fixed relationship to the build platform 130. A rail 124 is fixed between the carriages 122 such that the rail 124 remains oriented in the x direction. A carriage 126 is configured to move under the control of the printing controller transversally in the x direction along rail 124. Positioning of the printhead 110 in the z direction uses a rail 128, which extends in the z direction, with the carriage 126 being configured to move the rail in the z direction (i.e., up and down). In this example, the printhead 110 is fixed to the rail 128, thereby allowing for positioning the printhead 110 in the z axis. The printer/scanner 100 includes a controller (not shown in FIG. 1), which controls the positioning of the carriages on the rails, thereby controlling the three-dimensional motion of the printhead. It should be understood that the positioning system 135 illustrated in FIGS. 1-2 is only a schematic example, and that other arrangements that enable three-dimensional positioning and motion of the printhead may be used. For example, as an alternative of z-axis positioning, the build platform 130 may be configured to be positioned along the z-axis such that the surface 142 of the object being fabricated remains at an optimal displacement from the printhead 110, which is configured to move in the x-y directions, and the entire build platform may move in three axes and the printhead remains fixed or also may move. In general, the approaches described below can be used with a variety of positioning systems.

The printing system 110 also includes a scanner 112, which is used to scan the object 140 being fabricated. In general, as described more fully below, scan data obtained from the scanner is used to adapt the control of the printhead and thereby adapt the fabrication of the object to accommodate deviation of actual fabrication of the object from an ideal fabrication plan. For example, the approach may accommodate deviation in the shape, material composition, and/or color of the object as it is being fabricated as compared to a model of the object. In the printer/scanner 100 shown in FIG. 1, the scanner 112 is configured to be positionable in three dimensions, and in particular in this embodiment is fixed relative to the printhead 110 such that the same positioning system 135 that is used to position and move the printhead 110 can be used to position the scanner. In other arrangements, a separate positioning system may be used for the scanner. Furthermore, as described further below, a scanning technology used in the scanner relies on the scanner 112 being positionable in the x-y plane above the object, but it should be understood that there are other scanning technologies that do not necessarily require such positioning, while nevertheless being able to provide suitable scan data for use in the approaches that are described below.

Referring to the cross-sectional view of FIG. 2 (i.e., in the x-z plane), a partially fabricated object 140 is shown, fabricated on the build platform 130. The partially fabricated object 140 is shown to have a surface 142 which is non-uniform in height (and therefore not perfectly level in the x-y plane, i.e., with the surface not planar or parallel to the build platform 130). In practice, although the printer may be controlled to deposit layers that ideally would yield a level surface, each layer having a constant height (z value) extending parallel to the build platform (i.e., parallel to the x-y plane), factors such as imperfect rate of material being deposited from the printhead, unpredicted or non-uniform volume changes during curing of the material, effects of interaction between materials, and so forth may result in an uneven surface like surface 142. The surface 142 is ultimately formed as a result of some of the most recently deposited layer having variation in height relative to previous layers. As described further below, the scanner 112 (not illustrated in FIG. 2) is used to scan the surface 142 to yield scan data from which a depth map of the partially fabricated object can be obtained. Such a depth map is used in part to modify the control of the printhead 110 so as to adapt to the non-uniform surface 142.

Figure 3:
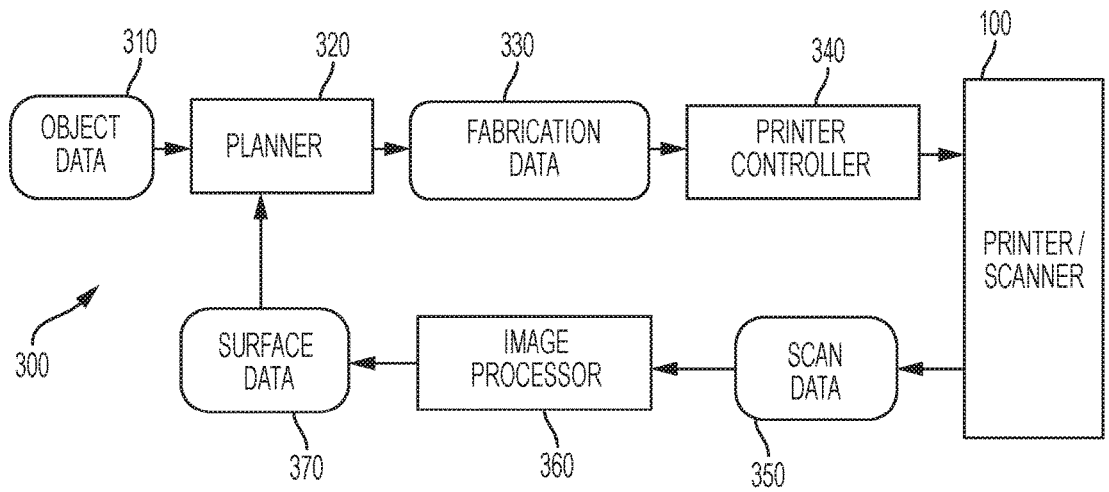
FIG. 3 is a block diagram of the printing system.

Referring to the functional block diagram of FIG. 3, operation of a printing system 300 that includes the printer/scanner 100 uses scan data 350 that is produced by the scanner 112 of the printer/scanner. The scan data 350 includes information characterizing the surface upon which further layers will be printed. An image processor 360 processes the scan data 350 to produce surface data 370, in this example including a depth map. Note that as discussed further below, "surface data" should be understood to include data associated with the boundary of the object, such as its height, and may also or alternatively include data associated with a region near the boundary for example in a shallow section (e.g., an adjacent volume having the thickness of one or several or hundreds of deposited layers) within the fabricated object. The depth map represents the actually achieved height of the partially-fabricated object as a function of (x,y) coordinates. A planner 320 uses the surface data 370 along with object data 310, which includes a three-dimensional object model, as input, and produces fabrication data 330, which generally characterizes multiple (e.g., 10-100) slices corresponding to layers to be deposited on the partially fabricated object. (In general, for the sake of clarity, a "slice" as used herein generally represents a thin portion of a model, while a "layer" generally represents the physical realization of a slice in the fabricated object.) Generally, the fabrication data includes a plan for each slice (a "slice plan"), where a plan for a particular slice includes a specified region (or regions) of the x-y coordinate space in which material is to be deposited, optionally also including characteristics such as thickness, material, etc., which may vary across each region. The fabrication data 330 passes to a printer controller 340 as input, and the printer controller 340 processes the fabrication data and provides resulting control information to the printer/scanner 100 in the form of printing instructions to be carried out by the printhead 110 and the positioning system 135 of the printer/scanner 100. As introduced above, the printer/scanner 100 is able to operate both as a printer and a scanner. For example, after the printer/scanner 100 has deposited layers of material for all the slices in the slice plan, it enters a scanning mode in which the scanner 112 senses the printed surface in a manner that captures information related to the relative distance between the scanner and the surface. This information is provided from the printer/scanner 100 as the scan data 350 discussed above. Various scanning techniques may be used, including a technique in which the scanner is passed back and forth in the x-y coordinate range.

Figure 4:
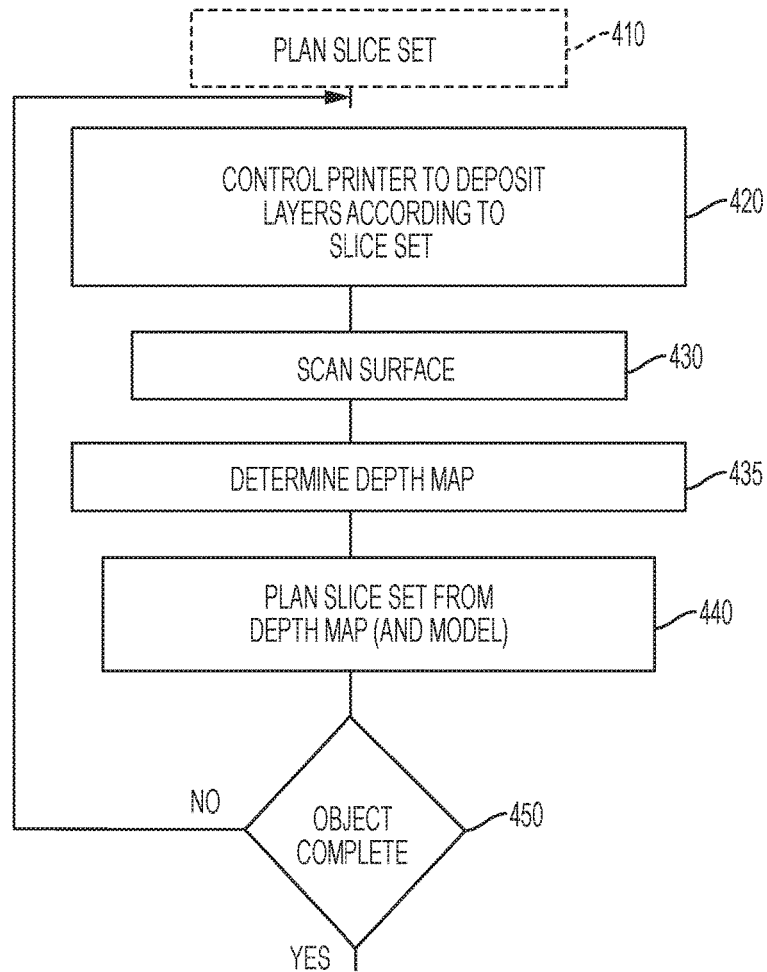
FIG. 4 is a flowchart of operation of the printing system.

Referring to FIG. 4, the planning and depositing process outlined above is shown in flowchart 400 in the case of accommodating variation in height in a partially fabricated object. The printing process can begin with planning an initial slice set (step 410) based on the object model. (Alternatively, the fabrication loop is entered at a scanning step 430 described below). For example, for an initial set of slices of the object, the first slices are planned as parallel planar thin section of the object model that are to be formed on the flat build surface. One aspect of each slice that is planned is the spatial extent in the x-y coordinates where material is to be deposited. Once the slice set has been planned, the system controls the printer to deposit layers of material according to the slice set (step 420), for example, according to the x-y spatial extent of each layer using a raster pattern of printer head motion. Once the material for the layers of the slice set has been deposited, the system scans the newly formed surface of the object (step 430), and based on the scan data obtained by the scanning determines a depth map that represents the achieved surface shape (step 435). In an ideal scenario, the depth map may show a perfectly horizontal (constant z) surface, but more typically there is variation in the depth over the surface of the partially fabricated object. The system now plans a next slice set based on the object model and the depth map using a procedure described below that adapts the slices to match the determined actual depth map and to deposit material only within the volume of the object as specified in the object model (step 440). If the object has been completely fabricated (i.e., there are no more layers to deposit) the process is complete (step 450). Otherwise, the planned slice set (determined at step 440) is used to control the printer to deposit the layers for the next slice set (step 420). As introduced above, this loop may be entered at a scanning step, where an initial surface structure is scanned before any slices are deposited. Although this may not be necessary in the case of fabrication on a perfectly flat build surface, in certain embodiments described in detail below, the fabrication may build an object on another structure, for example, electronic circuitry, a support structure, etc., and the initial scan may characterize the surface of that other object.

Referring back to FIG. 3, the image processor 360 receives the scan data 350. For example, the scan data may provide, for multiple x-y coordinates (for example, on a regular grid), a density value as a function of distance from the scanner in the z direction, such that at the surface a rapid change in density signals the presence of the surface of the object. The image processor 360 essentially translates the scan data into a characterization of the surface, for instance including a depth map of the partially-fabricated object. For example, the depth map represents the fabricated height (z value, height above the build platform 130) of the object as a function of x-y position (i.e., a function $z(x,y)$), in a coordinate system compatible with the object model of the object data 310. For example, the image processor 360 accounts for the z distance between the build surface 130 and the scanner in determining the depth map.

Generally, the depth map defines a cut (i.e., a two-dimensional surface) through the three-dimensional object model, such that the part of the object below that cut has been fabricated, and the part above the cut has yet to be fabricated. The planner 320 determines the fabrication data to form a next part of the object to be fabricated corresponding to the part of the model above that cut.

Figure 5:
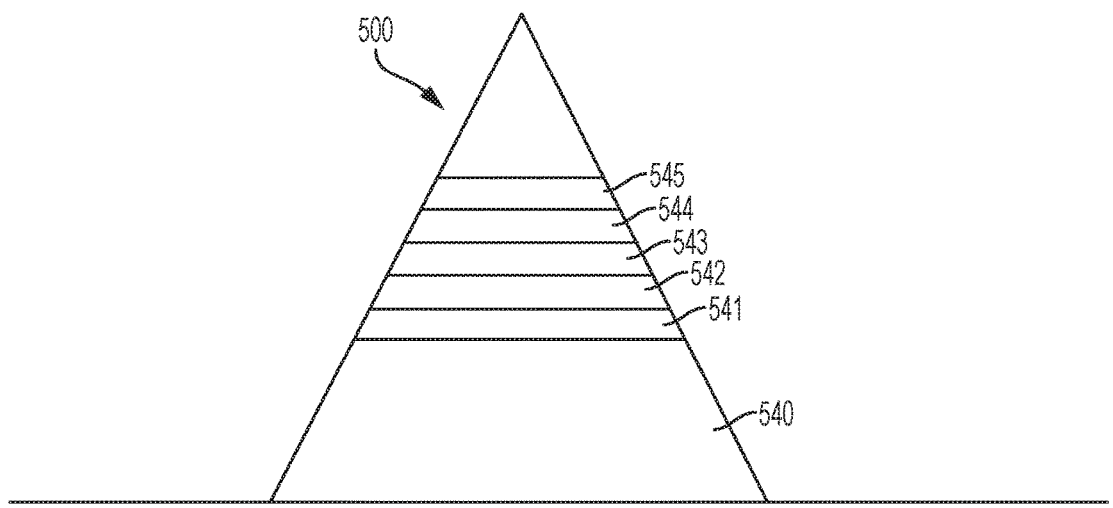
FIG. 5 is a cross-section of an object showing planar fabrication layers.

Referring to a cross-sectional view in FIG. 5, the process described above with reference to the block diagram of FIG. 3, and the flowchart of FIG. 4 is illustrated in the context of fabricating a conical object 500 (in cross-section a triangle). In this illustration, a part 540 of the object has been fabricated, and the system plans a set of next layers 541-545 to be printed sequentially on top of the part 540. In this example, the top surface of the part 540 is assumed to be perfectly planar in the horizontal (x-y) plane, and each slice is planned to form a further horizontal planar layer. The extent of each slice is planned such that each fabricated layer in this example is successively smaller forming the cone shape of the model of the object. That is, in this ideal case, each layer would form a disc parallel to the x-y plane, with the edge of the disc being determined by the intersection of the plane of the layer and the cone, which forms a circle in the x-y coordinates. In FIG. 5, the layers 541-545 are illustrated as being fabricated with uniform thickness, thereby maintaining the planar horizontal surface of the top layer 545. After depositing layer 545, the process would then continue to form the entire object.

Figure 6:
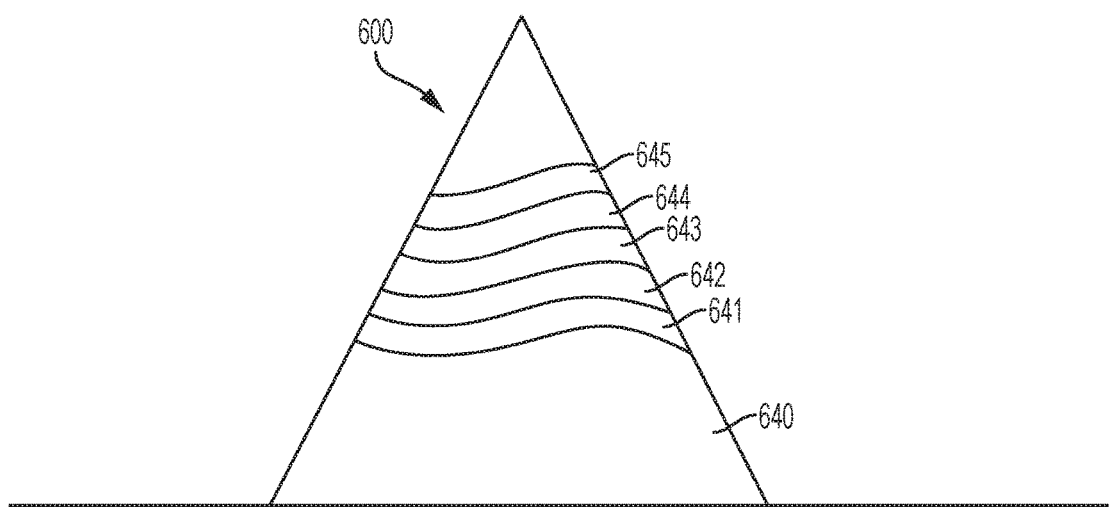
FIG. 6 is a cross-section of an object showing non-planar fabrication layers.

Referring to a cross-sectional view in FIG. 6, a process of fabricating a conical object 600 of the same shape as illustrated in FIG. 5 is illustrated when the layers are not perfectly planar. In this illustration, a part 640 of the object has been fabricated. However, unlike the part 540 illustrated in FIG. 5, the top surface of this part 640 does not have a uniform height, and has a non-planar shape. After fabricating this part 640, the system scans the surface to determine the depth map of the partially fabricated object (steps 430 and 435 of FIG. 4). In this illustration, the slice set is planned to have uniform layer thickness, but the slices are not planar in shape. Rather, the slices are planned to be fabricated on the partially-formed surface such that each layer has the same shape but offset in height. That is, the slices are parallel but not generally planar. Note that the spatial (x-y) extent of each slice is not exactly circular in this illustration due to the non-uniform height of the surface on which each layer is to be formed. It is important to recognize that if the slices had been pre-computed, the difference between the ideal x-y extent of each slice versus the computed extent based on the depth map could cause inaccuracy in the shape (e.g., the form of the ultimately formed outside surface) of the fabricated object. In this illustration, the set of layers 641-645 are deposited on the part 640 (step 420 of FIG. 4), in this illustration achieving uniform thickness. Note that in practice, even if layers 641-645 are planned to have exactly uniform thickness, such uniformity may not be achieved, and the next top surface will not have exactly the same shape as the previous top surface. However, by repeating the scanning process, the procedure for planning the next slice adapts to deviation from perfectly uniform layers.

Figure 7:
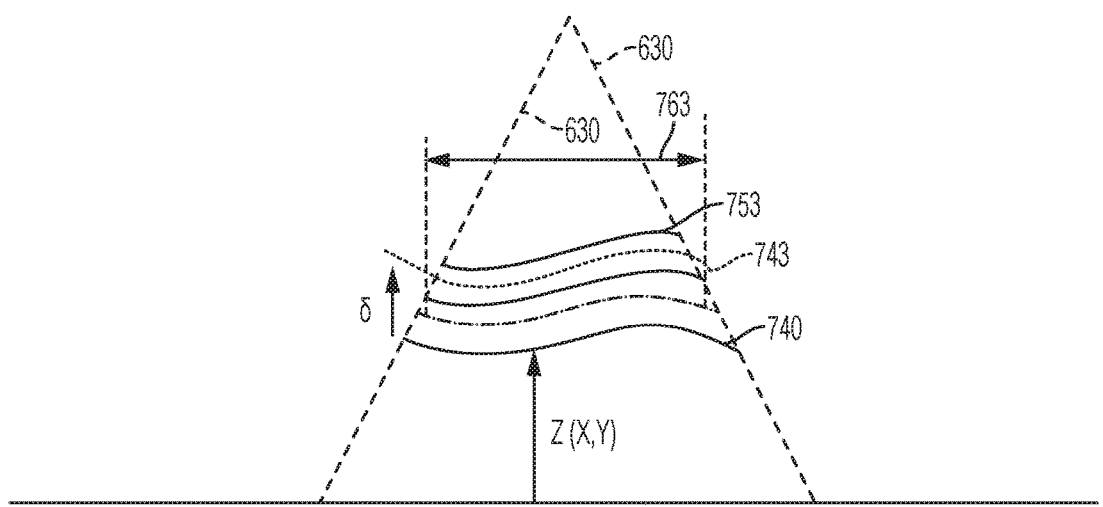
FIG. 7 is a diagram illustrating a computation of characteristics of a non-planar slice of an object.

Referring to a cross-sectional (x-z plane) view in FIG. 7, one approach to determining the geometry of a next slice 753 makes use of the depth map 740 of the partially fabricated object. The depth map 740 is illustrated to vary across the x dimension, represented as a function z(x,y). As discussed above, the depth map z(x,y) can be determined from a scan of the surface of a partially-fabricated object. In this approach, to plan a layer that will be at height δ above the layer, an offset depth map 743 is determined by adding δ to z(x,y). To determine the special extent 753 of the layer, that is, the range of x-y coordinate on this offset depth map that fall within the object being fabricated, an intersection of the depth map 740 and the model surface 630 of the object. The offset value δ in this approach is based on the planned thickness of the layers to be fabricated. In this illustration, the slice 753 is the third slice to be fabricated on the surface of the partially fabricated object, and therefore δ is chosen to be 2.5 times the planned layer thickness so that the offset depth map is planned to fall midway vertically in the slice.

Figure 8:
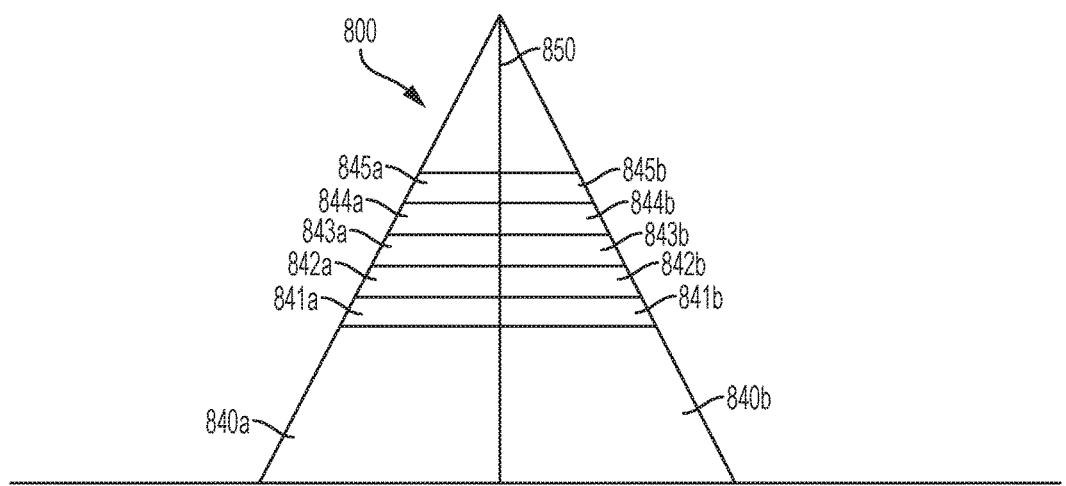
FIG. 8 is a cross-section of an object showing multi-material fabrication layers.
Figure 9:
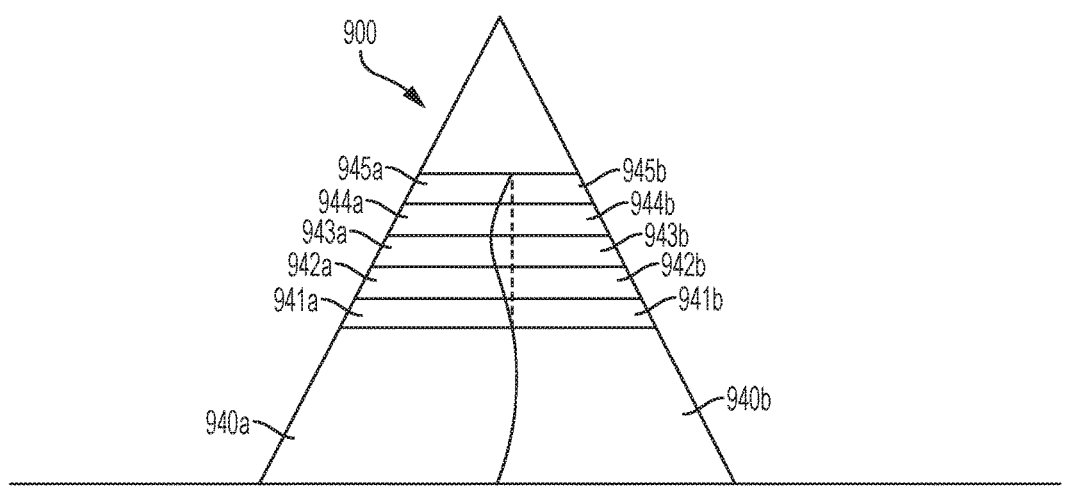
FIG. 9 is a cross-section of an object showing non-uniform multi-material fabrication layers.

Referring to FIGS. 8-9, the general approach of using scanning of partially fabricated objects to adapt the plan for further layers can be used for other aspects than non-planar surface shape. For example, adaptation of depositing of multiple materials may use the same general approach illustrated in FIG. 3. In much the same way a color inkjet printer can print a color image using more than one printhead (each able to supply a distinct color), the printer/scanner 100 may be outfitted with more than one printhead, each one capable of supplying a different material during the fabrication of the model. Generally, in this example, the object data 310 includes a model that specifies not only the three-dimensional shape of the object, but also specifies the material composition within the object. The planner uses this object data to form fabrication data that yields the desired material composition within the object by instructing the printer to deposit the appropriate material or mixture of materials at each (x,y) location.

Referring to the cross-sectional view in FIG. 8, a conical object is fabricated in much the same way as conical object 540 shown in FIG. 5. However, in this example, the conical object 800 is designed to be made from two materials, each of one half of conical object 840 being made from a different material (material "A" on the left and material "B" on the right), with the boundary between the materials dividing the object down the geometric center of the object, shown as dividing line 850. As in the example discussed with reference to FIG. 5, a part 840A-B of the conical object 800 has been fabricated. For this example shown in FIG. 8, we assume that perfectly horizontal planar layers are formed during fabrication. Part 840 has been fabricated with parts 840A and 840B have the desired boundary between material "A" and "B" along dividing line 850. After forming the part 840A-B, the system plans further slices 841A-B through 845A-B, such that each slice has a part from a section of material "A" and a section of material "B" on either side of dividing line 850, for example, with layer 841A-B being formed of a section 841A of material "A" and a section 841B of material "B". In this ideal example, each layer form a disc in the x-y plane, with the edge of the disc being determined by the intersection of the plane of the layer and the cone. Layers 841A-B through 845A-B are illustrated as being fabricated with uniform thickness, thereby maintaining the planar horizontal surface of the top joint layer 845A-B, and ideal transitions between materials "A" and "B".

Referring to the cross-sectional view in FIG. 9, another example of a process for fabricating a conical object 900 is shown, similar to that which is shown in FIG. 8. However, FIG. 9 differs from FIG. 8 in that although the material transition of the model of the object falls along the center line, as fabricated the part 940A-B does not yield the designed boundary and rather a dividing line between the materials follows a boundary 950. For example, irregular flow of the material from the printheads, or flow on the object before curing, may cause the imperfect transition location between the materials. In this example, based on scan data from the fabricated part 940A-B of the object, the planner plans further slices to compensate for the actual boundary for example, by depositing material to form a continuous boundary that achieves the desired average location.

More generally, in the multi-material fabrication case, the planner 320 determines the slices of the model for the next layers taking into account both the achieved geometry (i.e., layer thickness) and material distribution (e.g., extent of material regions and/or fractional composition of the mixture of material by location) of the partially fabricated object. Note that some of the variability in layer thickness may be related to the use of multiple material, for example, with some materials shrinking more than others during curing, or interactions between materials causing particular volume changes. In this case, the geometry is used to plan the geometry of the planned slice set, and the material distribution within the partially fabricated object is used to plan the material distribution in the next slices. In some examples, a volumetric error diffusion algorithm is used to compensate for the errors in material distribution incurred in the prior layers. This is also useful when a multi-material digital model is specified using continuous mixtures of materials (e.g., functionally graded materials).

In the multiple material case, the scan data 350 (see FIG. 3) produced by the scanner may include data from multiple visible and/or infrared spectral ranges from which the material composition may be inferred. For example, each material typically has a different spectral reflectance and the material composition can be determined by analyzing differences between spatially varying multispectral reflectance. Other features such as density, homogeneity, etc., may be used to transform the scan data to a map of the achieved material composition.

In some cases, the multiple materials may differ in their color, and the scan data may be used to adapt to the achieved color. For example, there may be variation in achieved color as a result of the curing process, and the system adapts the combination of materials to yield the desired color or color distribution on the surface or within the object.

The adaptation process for addressing geometric variation is particularly useful in certain multiple material situations in that it can compensate for substantial differences in thickness among the materials used in the printing process. For example, this approach does not require that all materials are optimized to have almost identical shrinkage/expansion properties so that when mixtures of materials are deposited next to each other, they form a continuous layer of substantially equal thickness. This method can adaptively slice future layers to compensate for difference in thickness.

Related to the discussion of use of multiple materials for fabrication, one case of multiple materials is where one of the materials is for support during fabrication, and removal after fabrication. For example, the support material and support structures are typically necessary when manufacturing objects with overhangs or elastic objects that can sag under their own weight. The approach described above handles the support material in a similar manner that multi-material adaptive deposition whereby the support material is handled as another material within a multi-material object. That is, the object model can include both the desired object and its support material structure as one combined "object."

Given an object model for an object whose finished form is to be made from a single material that may sag under its own weight, the system creates a plan for this object using multiple materials, even though the finished object is only to be made from one material. The system may then proceed to create a plan for the object integrating areas of support that are made from a rigid material with the intention of being temporary (and therefore removed once the printing process has completed). Types of objects that may require this sort of multi-material support during the printing process may not only be those made from elastic materials prone to sagging, but may also be objects that are not necessarily meant to balance freely in any way (i.e., a component meant to fit in a larger object), and therefore require support material to impose some notion of balancing freely for the purposes of printing. While the support material used in this multi-material process may vary, it is always intended to be temporary and removed once the printing process has completed.

In the discussion above, the planned slices are described as having uniform thickness. More generally, the slices may be designed to have varying thickness, which is achieved by controlling the printhead(s) to deposit material at varying rate as the printhead(s) travel across the surface of the object. One reason to design a varying thickness relates to accurate edge fabrication. In the simple conical example shown in FIG. 5, the outer edge of each layer preferably has a tapered profile so that the stack of layers yields a smooth outer surface of the object. Therefore, it should be understood that each slice may be formed as a volumetric intersection of an offset uniform thickness section from the achieved surface with the volume of the object model. At the interior of the object the resulting slice has uniform thickness while at the edges is has the appropriate taper.

As introduced above, the scanning of the object is performed after a number of layers are deposited, for example, after 10 layers are deposited. An alternative is to scan the surface more frequently. An advantage of scanning more frequently is the potential increase in accuracy. However, separate scanning may add time to the total time to manufacture an object. Therefore, deferring a scanning step and slice planning until a set of layers are deposited any provide a useful tradeoff between accuracy and speed.

In some implementations, the number of layers that are formed between scans is not fixed, and rather is adapted during the fabrication process. For example, to the extent that the layers are deposited with predictable shape (even if it is not planar), then the scanning interval may be increased to more layers. To the extent that the achieved shape is not well predicted, the scanning interval may be decreased.

In some implementation, a fixed or initial number of layers between scans may be selected based on the material and/or the geometry of the object being formed. For example, based on experimental data it may be known that a certain material yields unpredictable thickness variation, and that therefore the scanning interval shown be smaller, while another material may be known to deposit in predictable thickness and therefore not require as frequent a scanning interval. Similarly, an object geometry with detailed features may warrant more frequent scanning, while an object with large-scale features may not require such frequent scanning.

More generally, there may be numerous features that determine the initial, or adapted, scanning interval, including the desired precision for the manufactured object, the geometric features or material composition within the object, the level of inaccuracies detected during the printing process, and the ratio of different materials detected during the printing processed for multi-material prints In some embodiments, the scanning is performed concurrently with the printing process, thereby not incurring a delay for scanning the object. For example, in a scanner/printer of the type shown in FIG. 1, with the printing pattern following a raster pattern with stripes in the x direction, with offsets of the stripes in the y direction, it may be possible to scan the achieved height of along a previous stripe at one y value, while depositing a stripe of a layer at another y value.

It should be understood that the approaches described above are not limited to a particular additive manufacturing process. For example, a variety of types of inkjet-based printing, photopolymer phase change inkjets, thermal phase change inkjets, inkjet metal printing, fused filament fabrication, and additive manufacturing using dispensing systems may be used.

Similarly, it should be understood that the approaches described above are not tied to a particular scanning technology. In general, the scanner gathers information on the partially fabricated object that is used to adapt the fabrication of the next layers. This information may include, but is not limited to, the top most surface of the partially printed object, a height map of the partially printed object, or full or partial volume scan of the partially printed object. A number of 3D scanning approaches may be used, including without limitation optical coherence tomography (OCT) such as time domain OCT, frequency domain OCT, swept source OCT, shape from specularity, confocal microscopy, interferometry, terahertz imaging, stereo triangulation, etc. In addition, a multispectral 2D scan (e.g., using a multispectral camera) can be also captured. One embodiment of the system uses optical coherence tomography (OCT), a kind of incoherent light interferometry, to scan a volume near the surface of the partially printed object and extract the top most surface. In a basic operation, the scanning system captures the information corresponding to the whole build volume. In an optimized operation to save scanning time, the scanning system captures the information corresponding to the area/volume spanned by the last printed layers, for example, the layers deposited since the last scan of the object. In some embodiments, the scanners might image a scanning area/volume that is smaller than a build area of the printing device. In this case, the scanning process divides the entire area/volume (or the area/volume spanned by the last printed layers) into smaller subsections. Then, it scans each subsection and combines the subsections into a complete scan. As introduced above, in some embodiments, the scanner may capture a small area directly below the scanner, and the scanner is passed over the object on a raster manner to build an entire scan of the object.

In some example, the planned slices may be designed to restore the surface to a planar shape parallel to the build surface. For example, the slices may be planned to form one or more corrective layers, for example, as described in Patent Publication US2016/0023403.

More generally, partially corrective layers may be planned using slices with thickness variation, which may only partially address the non-planar shape of the surface. For example, the difference between the maximum and the minimum height within the topmost surface of the object can increase as more layers are deposited. However, it may be desirable to keep this height difference within a constrained range (typically less than a few millimeters). One reason for this is that for many additive manufacturing processes the accuracy of the deposition depends on the distance between the printhead and the fabricated object. Ideally this distance should be less than a few millimeters. If the height difference is large and the printhead is close to the surface, the printhead might collide with the fabricated object and damage it. Thus, this adaptive process ensures that the height difference is always within the desired range. This is achieved by selectively reducing material deposition in the areas with maximum/large height and increasing material deposition in the areas with minimum/small height. For example, this is done by manipulating layer thickness (e.g., in inkjet processes selectively changing droplet sizes) or adding additional layers in the low height areas.

Figure 10:
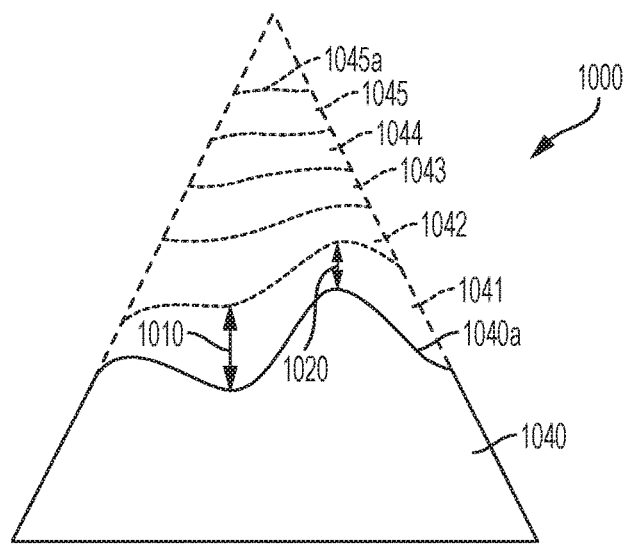
FIG. 10 is a cross-section of an object showing surface height range reduction.

Referring to FIG. 10, bottom part 1040 of an object 1000 has been fabricated, and is shown to have a dramatically uneven surface 1040a. In this example, the overall variation in height of uneven surface 1040a is greater than the variation in height that the printer (not shown) preferably accommodates. For example, with the illustrated range of height, the printhead may have to be farther from the surface, yielding inaccuracies in material deposition. A general approach outlined above to addressing such a situation is for the planned slice set to reduce the variation, for example, by excluding the "high" (x-y) regions from certain slices, or reducing the planned thickness of the slices in such regions. For example, as illustrated, slices 1041-1045 may be planned to have varying thickness, and planned to achieve an overall surface 1045a, which may be but is not necessarily planar. For example, the slice 1041 may be planned with one thickness 1010 in a "valley" and a smaller thickness 1020 near a "peak" of the scanned surface.

It should be understood that planning the slice thickness is only one way of planning the manner in which the printhead(s) may deposit material for a layer. More generally in the case of drop-on-demand printing, the size of material drops, precise locations, or other characteristics controllable by a driving waveform of the printhead may be planned to adapt to the already fabricated part of the object. For example, it may be beneficial to deposit may small drops near the edge of the object or near fine geometric structures, while depositing larger drops in the bulk of the object.

In many application scenarios, it is desirable to combine auxiliary objects with an additively manufactured object. For example, one can combine integrated circuits (ICs), interior support structures, or pre-fabricated (e.g., bulk) components, with an additively manufactured enclosure or cover. Very generally, the auxiliary object may be treated as being part of the model of the object to be fabricated.

In one situation, the auxiliary object is at the bottom of the object, and can be placed directly on the build platform 130 before the additive fabrication process begins. An initial scan determines the precise location of the auxiliary object, enabling spatial registration of the auxiliary object and the object model. At this point, the depth map of the partial object, which at this point is only the auxiliary object, is used to begin planning slice sets, for example as shown in the flowchart of FIG. 4 beginning at step 430 (i.e., with the placement of the auxiliary object essentially replacing step 420). The process then continues as described by the flowchart until the object is completely fabricated. Note that if the auxiliary object is particularly thick, rather than planning the slices to extend over the whole surface, the range of height may be reduced by limiting the slices to "low" regions until the overall height variation is suitably limited to permit accurate depositing of material over the entire surface extent of the partially fabricated object.

More generally, in another auxiliary object situation, the auxiliary object is added to the object after a part has been additively fabricated. That is, the auxiliary object does not have to initially rest on the build platform. In order to combine an additively manufactured part of the object with one or possibly multiple auxiliary objects, the method proceeds as follows. The object is partially fabricated until the position of the first auxiliary object is reached. This might include printing more layers such that empty spaces in the manufactured object are formed where the auxiliary object is to be inserted. Then, the first auxiliary object is inserted at the correct place. This can be done by an automated robot (e.g., a pick and place machine) or manually (e.g., by a human operator). At this point, a scan of the combination of the partially fabricated object and the newly added auxiliary object is scanned to determine a depth map for the combination, and the planning of the slice sets continues based on the object model and the depth map.

When there are more auxiliary objects to add, the process continues manufacturing until the position of the next auxiliary object is reached. Next, the auxiliary object is inserted. The method continues in this manner until the whole additively manufactured object is fabricated.

Note that the scanning of the combined object after the insertion of an auxiliary part may be used to detect errors in the placement. For example, there may be a prescribed tolerance for the placement of the auxiliary object, and if that tolerance is exceeded, then the auxiliary object may be repositioned, and the scan performed again to yield a new depth map. If the tolerance is satisfied, then the additive fabrication process can continue.

Note that the additive material deposition after adding the auxiliary part is adaptive to the exact placement of the auxiliary part, thereby avoiding the possibility of voids or other defects that might arise from tolerable but not precise placement of the auxiliary object.

As introduced above, in some examples, the scanning process yields information about the partially-fabricated object not only directly at the surface, but at least for a depth of the layers of the slice set that was deposited since the last scan of the object. The information about these fabricated layers may include density, for example, in the case of a single-material fabrication situation, and may include material composition, for example, the fractional composition of multiple materials. Although each scan includes information about a small number of layers of the objects, the scans may be stored and vertically "stitched" together, for example, based on the known z-height of the scanner at each of the scans. For example, each scan may provide a non-planar thin segment of an overall synthesized three-dimensional image of the interior of the object.

The information in this synthesized image may be used, for example, to estimate and report errors between the digital model and the manufactured object. This includes both the geometric errors and errors in material placement (e.g., in the case of multi-material additive manufacturing). This information may also be used to estimate and report errors in placement of auxiliary objects, or to guide further manufacturing than requires accurate knowledge of the locations of the auxiliary objects, for example, to make electrical connections. Synthesized three-dimensional image may also be used for quality assurance purposes, estimation of object properties, and for part certification according to given guidelines.

The techniques described above may be used in conjunction with components (e.g., positioning, printing, materials, imaging components) described in a publication by Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing" in the *ACM Transactions on Graphics* (*TOG*), vol. 34, no. 4, *Proceedings of ACM SIGGRAPH* 2015, (August, 2015): paper 129, which is incorporated herein by reference. Similarly, the techniques described above may be used with techniques and components described in U.S. patent application Ser. No. 14/645,616, filed Mar. 12, 2015, published as US2016/0023403 on Jan. 28, 2016, titled "Systems and Methods of Machine Vision Assisted Additive Fabrication," which the benefit of U.S. Provisional Patent Application Ser. No. 62/029,921, filed Jul. 28, 2014. These patent applications, available to be public, are also incorporated herein by reference. Furthermore, a combination of approaches described above and in these incorporated documents may be used. For example, a combination of adaptation to the achieve surface geometry for planning slice sets, and planning corrective layers to be able to return to pre-planned slices, may be used.

Figure 11:
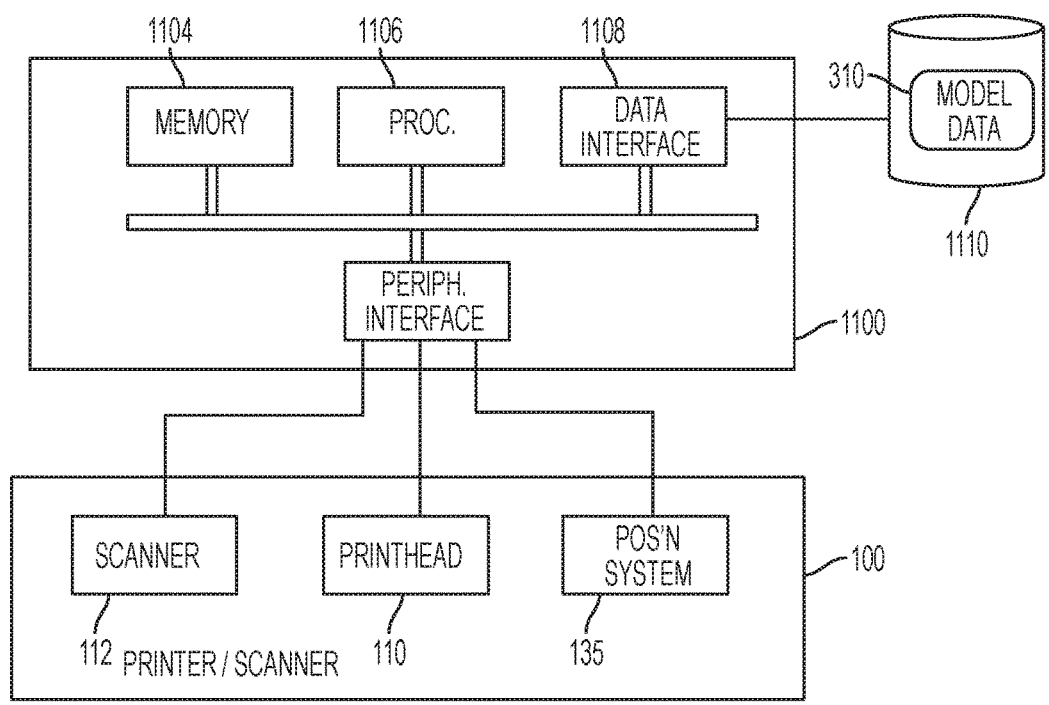
FIG. 11 is a printing system.

The functional components of the system, for example, the image processor 360, the planner 320, and the printer controller 340, may be implemented in software, in hardware, or in a combination of software and hardware. Software can include processor instructions stored on a non-transitory machine-readable medium (e.g., non-volatile semiconductor memory), such that when executed by a processor, the instructions cause the processor to perform the functions described above. Hardware implementations may include application specific integrated circuits (ASICs), field programmable gate arrays (FPGSs), microcontrollers, and the like. Referring to FIG. 11, in an example implementation, a computer 110 hosts components including the image processor 360, planner 320, and printer controller 340, which are implemented in software. The software executes on a processor 1106 of the computer, using memory 1104 and communicating with the printer/scanner 10 via a peripheral interface. The computer also includes a data interface 1108, for accessing a data storage device 1110 holding the model data 310.

It is to be understood that the foregoing description is intended to illustrate and not to limit the scope of the invention, which is defined by the scope of the appended claims. Other embodiments are within the scope of the following claims.

What is claimed is:

1. A method for additive fabrication of an object represented by three-dimensional model data, the method comprising:
   computing, using first scan data obtained from a scanner after fabricating a first part of the object forming a first surface of the object, first surface data characterizing the first surface of the object;
   determining second fabrication data characterizing a second set of layers for additive fabrication on the first surface of the object according to the first surface data and the three-dimensional model data for the object, wherein at least one layer of the second set of layers represents a non-planar surface determined from the first surface data; and
   providing the second fabrication data to control a printer for fabricating the second set of layers.

2. The method of claim 1, wherein the first surface of the object has a varying level.

3. The method of claim 1,
   wherein the second set of layers are determined to be offset from the first surface, and to have spatial extent in dimensions along the first surface determined from the model data for the object.

4. The method of claim 3 where each layer of the second set of layers is determined to have uniform thickness, each layer being each uniformly offset from the first surface.

5. The method of claim 1, wherein the first surface data includes a first depth map for the first surface.

6. The method of claim 5, wherein determining the second fabrication data characterizing the second set of layers comprises, for each layer of the second set of layers:

determining an offset depth map relative to the first depth map, determining a cross-section corresponding to an intersection of the offset depth map and the object, the intersection determined from the three-dimensional model data, and determining a spatial extent of the cross section.

7. The method of claim 1, wherein the model data characterizes a material composition throughout the object, and the first scan data represents a varying material composition associated with the first surface of the object.

8. The method of claim 7, wherein the second set of layers are determined to have varying material composition determined from the object data and from the varying material composition associated with the first surface, to match the material composition characterized by the model data.

9. The method of claim 1, further comprising:
fabricating the first part of the object, including forming the first surface.

10. The method of claim 1, further comprising:
fabricating a second part of the object on the first surface of the object, including fabricating each layer of the second set of layers according to the determined second fabrication data.

11. The method of claim 10, wherein fabricating the second part of the object forms a next surface of the object, and the method further comprises, repeating one or more times:
computing, using scan data obtained from the scanner after fabricating a second part of the object forming a next surface of the object, next surface data characterizing the next surface of the object; and determining next fabrication data characterizing a next set of layers for additive fabrication on the next surface of the object according to the next surface data and three-dimensional model data for the object; and fabricating a next part of the object on the next surface of the object, including fabricating each layer of the next set of layers according to the determined next fabrication data, fabricating the next part including forming the next surface of the object.

12. The method of claim 11, further comprising combining scan data obtained from the scanner after fabricating multiple parts of the object to synthesize a three-dimensional image of the fabricated object.

13. The method of claim 1, further comprising forming the first part of the object by combining of an auxiliary object with a part formed by additive fabrication, wherein the auxiliary object forms at least part of the first surface of the object.

14. The method of claim 1 wherein the non-planar surface is determined to be offset from the first surface, and a have spatial extent in dimensions along the first surface determined from the model data for the object.

15. The method of claim 14 wherein determining the second fabrication data includes determining a cross-section corresponding to an intersection of the offset from the first surface and the object determined from the three-dimensional model data.

16. The method of claim 14 wherein the at least one layer is determined to have uniform thickness.

17. A non-transitory machine-readable medium comprising instructions for causing a computer controller three-dimensional printing system to:
compute, using first scan data obtained from a scanner after fabricating a first part of the object forming a first surface of the object, first surface data characterizing the first surface of the object;

determine second fabrication data characterizing a second set of layers for additive fabrication on the first surface of the object according to the first surface data and the three-dimensional model data for the object, wherein at least one layer of the second set of layers represents a non-planar surface determined from the first surface data; and provide the second fabrication data to control a printer for fabricating the second set of layers.

18. A three-dimensional printing system comprising a controller configured to:
compute, using first scan data obtained from a scanner after fabricating a first part of the object forming a first surface of the object, first surface data characterizing the first surface of the object;

determine second fabrication data characterizing a second set of layers for additive fabrication on the first surface of the object according to the first surface data and the three-dimensional model data for the object, wherein at least one layer of the second set of layers represents a non-planar surface determined from the first surface data; and provide the second fabrication data to control a printer for fabricating the second set of layers.

* * * * *